March 8, 1966 NOBUTOSHI KIHARA 3,239,603

MAGNETIC REPRODUCING SYSTEM

Filed Sept. 19, 1962

Inventor
Nobutoshi Kihara by Hill, Sherman, Meroni, Gross & Simpson
Attys.

3,239,603
MAGNETIC REPRODUCING SYSTEM
Nobutoshi Kihara, Shibuya-ku, Tokyo, Japan, assignor to Sony Corporation, Tokyo, Japan, a corporation of Japan
Filed Sept. 19, 1962, Ser. No. 224,707
Claims priority, application Japan, Sept. 22, 1961, 36/34,355
12 Claims. (Cl. 178—6.6)

Figure 1:
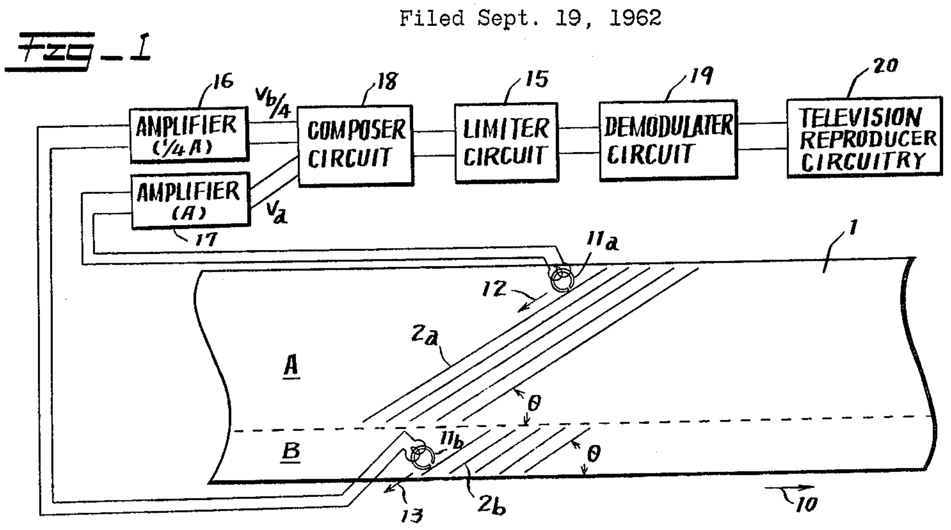

This invention relates to a reproducing system and particularly to a magnetic reproducing system in which picture signals and vertical blanking signals are reproduced primarily from respective separate zones on a magnetic record medium by separate scanning heads operating alternately, but wherein there is a certain degree of overlapping in time of the signals recorded in the respective zones so that there is a corresponding partial overlapping of the trains of signals produced by the respective scanning heads.

The present invention is particularly suitable for use in an improved magnetic reproducing system in which two groups of skew magnetic tracks are alternately scanned by respective playback heads and in which one group contains primarily vertical blanking signals while the other group contains primarily the remaining portions of a video signal.

In general, one object of this invention is to provide a magnetic reproducing system in which a plurality of time overlapping trains of signals reproduced from respective magnetic tracks of a magnetic record medium are recombined without accompanying beat noises at the overlapped portions of the signals.

Another object of the invention is to provide a magnetic recording and reproducing system in which main and auxiliary signal portions which are overlapping in time are separately reproduced and then combined without producing beat noise at the overlapping portions of the signals while maintaining the signal to noise ratio of the main signal and without significant loss in the effective utilization of the auxiliary signal.

A further object of the invention is to provide a magnetic reproducing system in which a plurality of signals recorded on a magnetic record medium are reproduced and composed electrically without using a mechanical switcher.

A still further object of the invention is to provide a magnetic reproducing system which is well suited for use in a video tape recorder of small size.

Generally the present invention contemplates enlarging the difference in the reproduced signal levels of the respective signal trains before combining such signal trains to reduce or minimize the amplitude of beat frequencies generated at the overlapping portions of the signal trains. For example, auxiliary signals included in information signals, such as the vertical blanking signal, other synchronizing signals or clock pulses of television signals may be reduced in amplitude level in the reproducing process before such auxiliary signals are recombined with the primary or information signals. Generally, such auxiliary signals have less critical requirements with respect to signal to noise ratio so that the reproduced signal level of such auxiliary signals can be substantially reduced for example by a factor of from ½ to ⅒ without seriously interfering with the effectiveness of such reproduced auxiliary signals.

Figure 2:
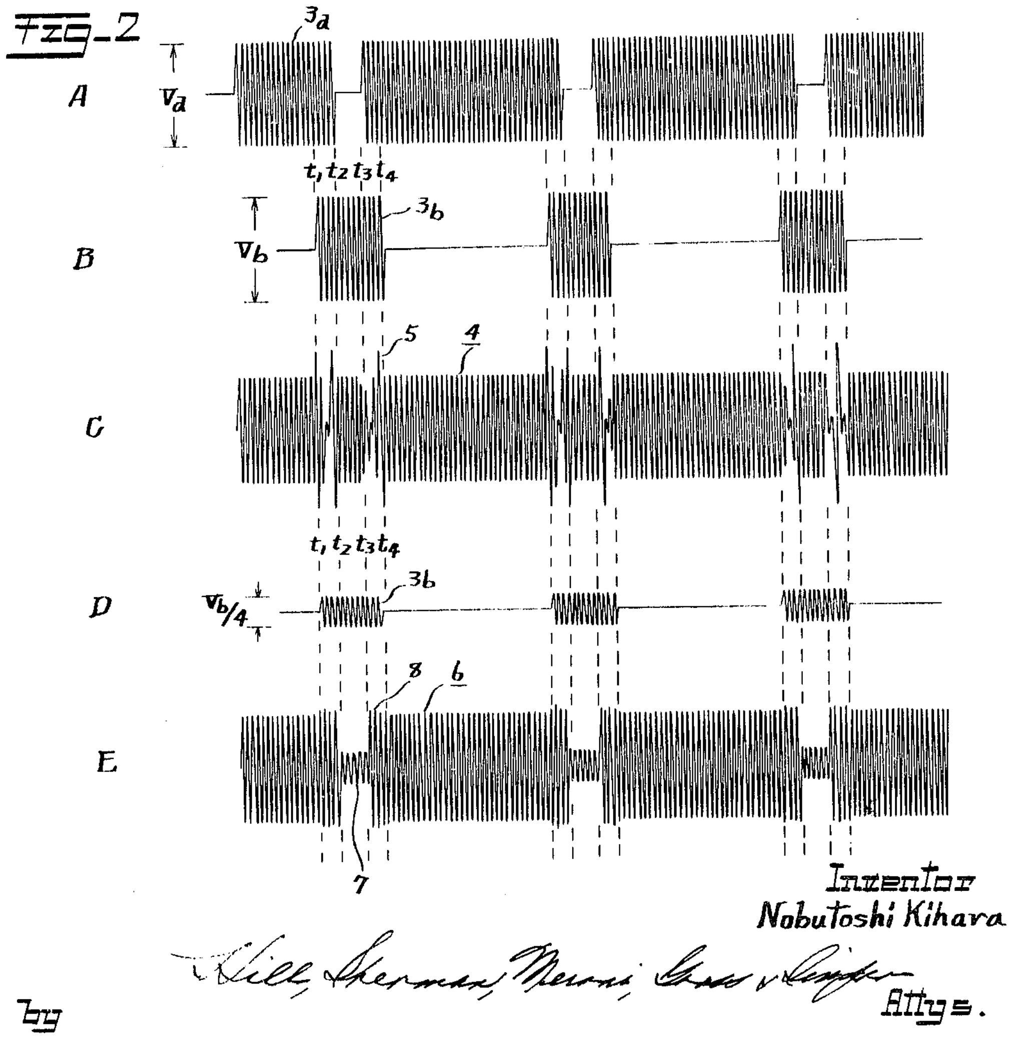

Other objects, features and advantages of the present invention will become apparent from the following description taken in connection with the accompanying drawings, in which:

FIGURE 1 is a schematic diagram of the magnetic reproducing system in accordance with the present invention; and FIGURE 2 shows signal waveforms for explaining the reproducing system of FIGURE 1.

In my copending U.S. patent application Serial No. 202,742, filed June 15, 1962, I have proposed a magnetic recording and reproducing system in which two record zones are formed on a record medium having magnetic tracks extending at an oblique angle to the direction of travel of the record medium. Such record zones are indicated on the magnetic tape record medium 1 in FIGURE 1 at A and B and comprise obliquely extending magnetic tracks 2*a* and 2*b* extending generally at an angle $\theta$ to the direction of travel of the record medium indicated by the arrow 10. The record zone A may contain primarily portions of the video signal other than the vertical blanking signals while the record zone B may contain primarily the vertical blanking signals. Thus, each track 2*a* may contain the picture information and horizontal synchronizing signals for one field of the video signal while each of the tracks 2*b* may contain the vertical blanking signal occurring in time between the successive fields of the video signal. As described in detail in said copending application Serial No. 202,742, a magnetic head such as indicated at 11*a* in FIGURE 1 may scan in the direction of arrow 12 along one of the tracks such as indicated at 2*a* while a second magnetic head such as indicated at 11*b* may scan along one of the tracks 2*b* in the direction of arrow 13. The arrangement of the magnetic heads and record medium is such that the head 11*b* scans one of the tracks 2*b* and as the head 11*b* is moving out of contact with the edge of the record medium, the head 11*a* begins scanning of one of the tracks 2*a* at the opposite margin of the record medium. This process is repeated cyclically so that the head 11*a* generates a train of electric signals in one channel of the playback circuitry while the head 11*b* produces a second, train of electric signals in a second channel of the playback circuitry with the two trains of signals generally alternating in time as indicated at 3*a* in FIGURE 2A and 3*b* in FIGURE 2B, for example.

The signals such as indicated at 2*a* and 2*b* may represent frequency modulated signals so that normally the reproduced amplitudes would be substantially equal to the playback circuits. Thus the successive signal trains 3*a* in FIGURE 2A would represent the successive fields of the video signal primarily while the successive trains 3*b* would represent primarily the successive vertical blanking signals reproduced from the record medium of FIGURE 1. In practice, the video signal and the vertical blanking signals are recorded so as to partially overlap in time as represented in FIGURES 2A and 2B in the time intervals $t_1$ to $t_2$ and $t_3$ to $t_4$. When signals such as indicated at 3*a* and 3*b* are mixed in a composer circuit, continuous original signals including the vertical blanking signals are obtained as indicated at 4 in FIGURE 2C. In this case, however, the video signals 3*a* and vertical blanking signals 3*b* produced in the respective playback channels are frequency modulated and hence beats are produced due to the phase difference of the two signals in the overlapping portions thereof with the result that the composite signal 4 has modulated regions as indicated at 5 in FIGURE 2C. Where the amplitudes 3*a* and 3*b* are equal, one-hundred percent modulation is produced with a relatively large noise level resulting at the overlapped portions from $t_1$ to $t_2$ and $t_3$ to $t_4$.

The present invention proposes that the level of one of the signal trains be reduced by a substantial factor, for example, by ½ to ⅒, with respect to the other signal level so that the two signals can be superimposed without the accompanying beat noise at the overlapping portions of the two signals. Preferably the vertical blanking signal 3*b* is reduced in amplitude as represented in FIGURE 2D by reducing its amplitude by a factor between about 2 and 10 as compared to the amplitude of the main signal portions 3$a$. Specifically FIGURE 2D represents a reduction by a factor of 4 so that the amplitude from peak to peak of the modulation V$b$ in FIGURE 2D is ¼ the peak to peak amplitude V$a$ of the main modulation portion 3$a$ represented in FIGURE 2A. By this means the signal level of the video signal portions 3$a$ is made large so that the signal to noise ratio is correspondingly high. Even if the signal to noise ratio of the vertical blanking signal portions 3$b$ in FIGURE 2D is lowered as a result of the amplitude reduction, this is not so important because the vertical blanking signal merely serves as a synchronizing signal and need not be reproduced as is the case with the picture signal portions with high fidelity. A slight decrease in the signal to noise ratio with respect to the vertical synchronizing signals is thus not so significant, while a reduction in the signal to noise ratio for the picture signal portions 3$a$ would generally not be satisfactory.

While if the objective is simply to eliminate the beat signal as represented at 5 in FIGURE 2C, it would be desirable to make the signal level 3$b$ as small as possible, generally the level of the signal 3$b$ should not be reduced below $\frac{1}{10}$ the amplitude of the main signal 3$a$ so that the composite signal will be effectively handled by the playback circuitry. For example, when adding the composite signal 6 of FIGURE 2E obtained by the mixing of the waveforms of 2A and 2D, the reduced amplitude signal portions 7 must be about $\frac{1}{10}$ or so of the large amplitude signal so as to be effectively transmitted by the limiter circuit indicated at 15 in FIGURE 1. The reduced amplitude signal such as indicated at 3$b$ in FIGURE 2D may be one-half of the large amplitude signal since the beat produced in this case involves 50% modulation and the corresponding noise can be effectively prevented by passing the composite signal through a limiter circuit such as indicated at 15 in FIGURE 1.

FIGURE 2E represents the composite signal produced when the amplifier 16 for the head 11$b$ has an amplification which is ¼ the amplification factor for the amplifier 17 associated with the head 11$a$. It will be apparent that when two such signals are composed by means of a composing circuit such as indicated at 18 in FIGURE 1 no substantial amplitude fluctuation occurs at the overlapping regions such as indicated at 8 in FIGURE 2E and accordingly a picture can be reproduced without substantial noise resulting from the beat signal. The waveform 6 shown in FIGURE 2E obtained from the composer circuit 18 is first supplied to a limiter arrangement 15 which has the effect of eliminating the fluctuations 8 and producing a constant amplitude output signal suitable for the frequency demodulator component 19 which supplies the original picture signal to the television reproducing circuitry 20 for producing a visual image in the usual manner.

The difference in amplitude between the signals 3$a$ and 3$b$ may be provided in any suitable manner. For example, magnetic heads 11$a$ and 11$b$ may be of different sensitivity so that the output voltage from the head 11$a$ will be a number of times such as from 2 to 10 times as great as the voltage amplitude from the head 11$b$. Alternatively, amplifiers 16 and 17 may provide different amplification factors as previously mentioned or various other means may be employed for producing the relative amplitudes as indicated in FIGURES 2A and 2D.

While the foregoing description has been primarily concerned with the reproduction of video signals, it will be apparent that this invention may be applied to the reproduction of other signals. Further, while recording in two record zones has been mentioned as an example, it will be apparent that the invention may be applied to the reproduction of signals recorded in more than two record zones.

It will be apparent that many modifications and variations may be effected without departing from the scope of the novel concepts of the present invention.

I claim as my invention:

1. In the method of reproducing a signal recorded on a record medium wherein a plurality of playback heads scan the record medium alternately to produce trains of electric signals in respective playback circuits with partial time overlapping therebetween and wherein the trains of electric signals from the respective playback circuits would produce beats at the overlapping portions thereof if directly recomposed, the improvement which comprises scanning the recorded signal by means of a plurality of playback heads and producing signals in the respective associated playback circuits of respective distinctly different amplitude levels and at least one of the playback heads scanning the record medium only at periodic intervals to produce an intermittent signal, and combining the signals of different amplitude levels from the respective playback circuits to provide a composite signal.

2. The method of reproducing signals from a record medium having primarily picture signal portions recorded in one region and primarily vertical synchronizing signal portions recorded in another region with time overlapping between the recorded signals of the respective regions which comprises scanning the respective regions to produce time overlapping trains of electric signals in respective playback circuits with at least one of said signals occurring periodically and having essentially zero signal gaps at predetermined periodic intervals, establishing an amplitude level for the signals from the region having primarily picture signals which is greater than the amplitude level of the signals from the other region in said playback circuits by a substantial factor of at least about 2, and combining the signals from the respective playback circuits having the respective amplitude levels.

3. The method of claim 2 with the additional step of subjecting the composite signal resulting from the combination of the signals of the respective playback circuits to an amplitude limiting operation to tend to eliminate amplitude fluctuations at the overlapping portions of the respective signals.

4. The method of recording and reproducing television signals which comprises producing a frequency modulated signal in accordance with a video signal to be recorded, recording primarily the picture signal portion of the frequency modulated signal on one region of the record medium and recording primarily the vertical blanking signal portion of the frequency modulated signal on another region of the record medium, scanning the respective recorded regions of the record medium by means of respective playback heads and producing signals in the respective associated playback circuits of respective distinctly different amplitude levels with the respective levels having a ratio within the range from about ½ to about $\frac{1}{10}$, with each of the signals being intermittent and having successive gaps therein occurring at predetermined periodic intervals and with the gaps in one of the signals alternating with the gaps in the other of the signals in time and combining the signals of said different amplitude levels from the respective playback circuits to provide a composite signal.

5. The method of claim 4 with the additional steps of subjecting the composite frequency modulated signal to an amplitude limiting operation and then to a demodulating operation to obtain the original video signal.

6. A reproducing system comprising scanning means for producing a plurality of trains of electric signals partially overlapping in time from corresponding signals recorded on a record medium, means for automatically always making the amplitude level of one of the trains of signals substantially different from that of another of said trains of signals, and means for automatically composing a composite train of signals from the trains of signals of respective different amplitude levels.

7. A reproducing system as defined in claim 6 wherein the level of one of the trains of electric signals is made from about ½ to 1/10 the amplitude level of the other train of electric signals.

8. A reproducing system comprising a record medium having frequency modulated signals corresponding primarily to the vertical blanking signals of a video signal recorded at one region and having frequency modulated signals corresponding primarily to the picture signals of a video signal recorded at another region of the record medium, respective scanning means for scanning the respective regions and producing respective trains of frequency modulated signals partially overlapping in time, means for establishing a substantially reduced amplitude level for the reproduced frequency modulated signals corresponding to the vertical blanking signals of the video signal, and means for combining the reproduced frequency modulated signals of different amplitude level to provide a composite frequency modulated signal from which the recorded video signal may be reproduced visually.

9. A reproducing system comprising scanning means for producing a plurality of trains of electric signals partially overlapping in time from corresponding signals recorded on a record medium, means for automatically always making the amplitude level of one of the trains of signals substantially different from that of another of said trains of signals, and means for automatically composing a composite train of signals from the trains of signals of respective different amplitude levels, said one of the trains of signals of respective different amplitude levels corresponding primarily to the picture signal portions of a video signal and said another of said trains of signals of respective different amplitude levels corresponding primarily to the vertical blanking signals of the video signal recorded on the record medium.

10. A reproducing system comprising scanning means for producing a plurality of trains of electric signals partially overlapping in time from corresponding signals recorded on a record medium, means for automatically always making the amplitude level of one of the trains of signals substantially different from that of another of said trains of signals, and means for automatically composing a composite train of signals from the trains of signals of respective different amplitude levels, said electric signals produced by said scanning means and the signals recorded on the record medium being frequency modulated signals having substantially constant amplitudes.

11. A reproducing system comprising scanning means for producing a plurality of trains of electric signals partially overlapping in time from corresponding signals recorded on a record medium, means for automatically always making the amplitude level of one of the trains of signals substantially different from that of another of said trains of signals, and means for automatically composing a composite train of signals from the trains of signals of respective different amplitude levels, said one of the trains of signals of respective different amplitude levels corresponding primarily to the picture signal portions of a video signal and said another of said trains of signals of respective different amplitude levels corresponding primarily to the vertical blanking signals of the video signal recorded on the record medium, the trains of signals of respective different amplitude levels differing in amplitude by a factor from about ½ to 1/10.

12. A reproducing system comprising scanning means for producing a plurality of trains of electric signals partially overlapping in time from corresponding signals recorded on a record medium, means for automatically always making the amplitude level of one of the trains of signals substantially different from that of another of said trains of signals, and means for automatically composing a composite train of signals from the trains of signals of respective different amplitude levels, said electric signals produced by said scanning means and the signals recorded on the record medium being frequency modulated signals having substantially constant amplitudes, said trains of signals of respective different amplitude levels having amplitude levels with a ratio from about ½ to 1/10.

References Cited by the Examiner

Tall, Joel, Techniques of Magnetic Recording, The Macmillan Company, New York, 1958, pp. 266–268.

DAVID G. REDINBAUGH, *Primary Examiner.*

HOWARD W. BRITTON, *Assistant Examiner.*